US007996349B2

(12) United States Patent
Dasdan et al.

(10) Patent No.: US 7,996,349 B2
(45) Date of Patent: Aug. 9, 2011

(54) METHODS AND APPARATUS FOR COMPUTING GRAPH SIMILARITY VIA SEQUENCE SIMILARITY

(75) Inventors: Ali Dasdan, San Jose, CA (US); Panagiotis Papadimitriou, Stanford, CA (US)

(73) Assignee: Yahoo! Inc., Sunnyvale, CA (US)

( * ) Notice: Subject to any disclaimer, the term of this patent is extended or adjusted under 35 U.S.C. 154(b) by 763 days.

(21) Appl. No.: 11/951,146

(22) Filed: Dec. 5, 2007

(65) Prior Publication Data
US 2009/0164411 A1 Jun. 25, 2009

(51) Int. Cl.
G06F 17/00 (2006.01)
G06N 5/00 (2006.01)
(52) U.S. Cl. .......................................... 706/46; 706/62
(58) Field of Classification Search .................. None
See application file for complete search history.

(56) References Cited

OTHER PUBLICATIONS

Blondel et al., V., "A Measure of Similarity between Graph Vertices: Applications to Synonym Extraction and Web Search", SIAM Review, vol. 46, No. 4 pp. 647-666, 2004.*
Henzinger, M., "Combinatorial Algorithms for Web Search Engines—Three Success Stories", SIAM 07,pp. 1022-1026, Jan. 2007.*
Fetterly et al., D., "Detecting Phrase-Level Duplication on the World Wide Web", SIGIR '05, pp. 170-177, Aug. 15-19, 2005.*
Melnik et al.,S., "Similarity Flooding: A Versatile Graph Matching Algorithm and its Application to Schema Matching", pp. 1-12, 2002.*

* cited by examiner

Primary Examiner — Jeffrey A Gaffin
Assistant Examiner — Adrian L Kennedy
(74) Attorney, Agent, or Firm — James J. DeCarlo; Greenberg Traurig, LLP

(57) ABSTRACT

This disclosure describes systems and methods for identifying and correcting anomalies in web graphs. A web graph is transformed into a sequence of tokens via a walk algorithm. The sequence is fingerprinted to form a set of shingles. The singles are compared to shingles for other web graphs in order to determine similarity between web graphs. Actions are then carried out to remove anomalous web graphs and modify parameters governing web mapping in order to decrease the likelihood of future anomalous web graphs being built.

9 Claims, 6 Drawing Sheets

METHODS AND APPARATUS FOR COMPUTING GRAPH SIMILARITY VIA SEQUENCE SIMILARITY

BACKGROUND

Web graphs are approximate snapshots of the web, created by search engines. The evolution of the web can be monitored via monitoring web graphs. Web graphs also enable global web properties such as GOOGLE'S PAGERANK to be computed where PAGERANK is a score assigned to a web page based on the importance of that web page. The importance of a web page is determined by the importance of the other web pages that hyperlink to the web page. Monitoring web graphs also provides a means to monitor the effectiveness of search engines and web crawlers or web spiders.

Web graphs are composed of nodes connected by edges. Nodes represent web pages and can be associated with one or more properties for the node's web page such as PAGERANK, domain level quality, and scores relating to spam, and the level of adult content among others. Edges represent the hyperlinks between web pages and can be associated with one or more properties such as the PAGERANK of the web page from which an edge originates.

SUMMARY

This disclosure describes systems and methods for identifying and correcting anomalies in web graphs. One aspect of the disclosure is a method comprising for selecting a first web graph, transforming the first web graph to a first sequence of tokens defined as $T=<t_1, \ldots, t_n>$ wherein $t_1, \ldots, t_n$ are tokens in the first sequence T, identifying a first set of token subsequences wherein each subsequence comprises k tokens, fingerprinting the first set of token subsequences to form a first set of shingles defined as S(T), selecting a second web graph, transforming the second web graph to a second sequence of tokens defined as $T'=<t_1', \ldots, t_n'>$ wherein $t_1', \ldots, t_n'$ are tokens in the second sequence T', identifying a second set of token subsequences wherein each subsequence comprises k tokens, fingerprinting the second set of token subsequences to form a second set of shingles defined as S(T'), computing the similarity between the first and second sets of shingles, and initiating web mapping based on the similarity between the first and second set of shingles.

Another aspect of the disclosure is a system comprising a crawler module that collects data about a plurality of web pages via a network from a crawler; a web graph module that selects two web graphs, computes the similarity between the two web graphs, and initiates web mapping based on the results of similarity computation; and an indexer module that indexes web pages based on results of the web graph module's similarity computation.

Another aspect of the disclosure is a computer readable media having computer-readable instructions tangibly stored thereon, the computer-readable instructions, when executed by a computer comprising: selecting a first web graph; selecting pre-determined nodes in the first web graph to form a set of nodes; determining if all nodes in the set have been tokenized; selecting a highest-ranked non-tokenized node from the set as a selected node; tokenizing the selected node to form an $i^{th}$ token where i is equal to the number of nodes previously tokenized plus one; determining if the selected node is outlinked to non-tokenized nodes in the set; selecting a highest-ranked non-tokenized outlinked node from the set as the selected node; repeating the tokenizing the selected node to form an $i^{th}$ token operation, the determining if the selected node is outlinked to non-tokenized nodes in the set operation, and the selecting a highest-ranked non-tokenized outlinked node from the set as the selected node operation until it is determined that the selected node is not outlinked to any non-tokenized nodes in the set; determining if all nodes in the set have been tokenized; identifying a first set of token subsequences wherein each subsequence comprises k tokens; fingerprinting the first set of token subsequences to form a first set of shingles defined as S(T); selecting a second web graph; selecting pre-determined nodes in the second web graph to form a second set of nodes; determining if all nodes in the second set have been tokenized; selecting a highest-ranked non-tokenized node from the second set as a selected node; tokenizing the selected node to form a first token; determining if the selected node is outlinked to non-tokenized nodes in the second set; selecting a highest-ranked non-tokenized outlinked node from the second set as the selected node; tokenizing the selected node to form an $j^{th}$ token where j is equal to the number of nodes previously tokenized plus one; repeating the tokenizing the selected node to form an $j^{th}$ token operation, the determining if the selected node is outlinked to non-tokenized nodes in the second set operation, and the selecting a highest-ranked non-tokenized outlinked node from the second set as the selected node operation until it is determined that the selected node is not outlinked to any non-tokenized nodes in the second set; determining if all nodes in the second set have been tokenized; identifying a second set of token subsequences wherein each subsequence comprises k tokens; fingerprinting the second set of token subsequences to form a second set of shingles defined as S(T'); computing the similarity between the first and second sets of shingles; and initiating web mapping based on the similarity between the first and second set of shingles.

These and various other features as well as advantages will be apparent from a reading of the following detailed description and a review of the associated drawings. Additional features are set forth in the description which follows, and in part will be apparent from the description, or can be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope of the disclosure in any manner, which scope shall be based on the claims appended hereto.

DETAILED DESCRIPTION

Figure 1:
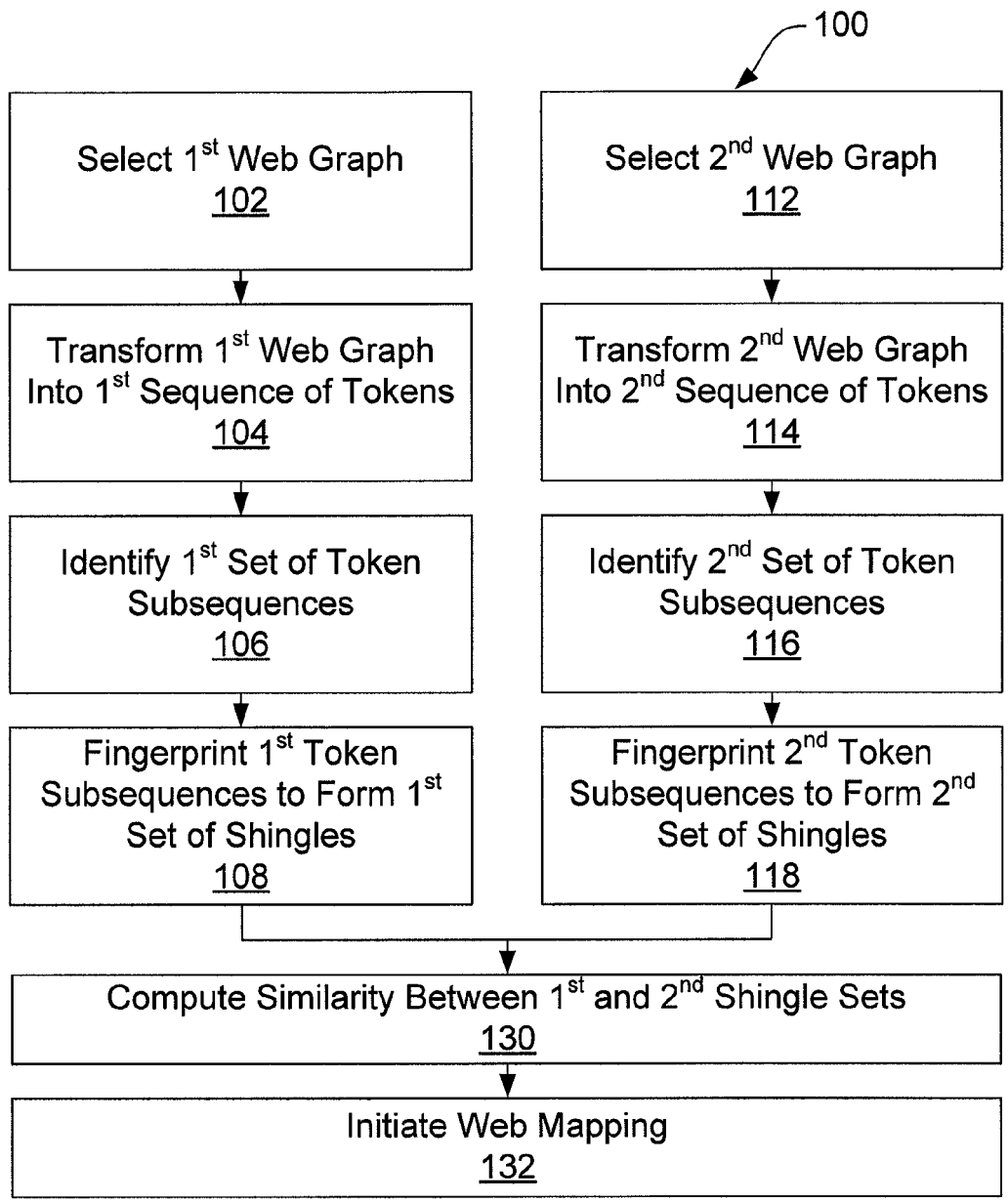
FIG. 1 illustrates a method for determining the similarity between two web graphs and initiating web mapping based on the similarity.

For the purposes of this disclosure a computing device includes a processor and memory for storing and executing program code, data and software. Computing devices can be provided with operating systems that allow the execution of software applications in order to manipulate data. Servers, personal computers, PDAs, wireless devices, cell phones, internet appliances, media players, home theater systems, and media centers are several non-limiting examples of computing devices.

For the purposes of this disclosure, a web page comprises a document that can be retrieved from a computing device. Other commonly-understood terms used to describe a web page include a document, web document, or internet document. A web page can be an HTML document or a non-HTML document such as a portable document (pdf). Web pages can be accessed from a computing device such as a server and can be accessed via a network. A web page can be viewed over the World Wide Web via a web browser. Web pages can be identified via a Uniform Resource Locator (URL) or a Universal Resource Identification (URI). Aggregations of web pages sharing a common domain are collectively referred to as a web site.

For the purposes of this disclosure a computer readable medium stores computer data in machine readable form. By way of example, and not limitation, a computer readable medium can comprise computer storage media and communication media. Computer storage media includes, but is not limited to, volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computing device.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules.

For the purposes of this disclosure an engine is a software, hardware, or firmware (or combinations thereof) system, process or functionality that performs or facilitates the processes, features, and/or functions described herein (with or without human interaction or augmentation). A search engine, by way of non-limiting example, can accept search criteria, such as search terms and dates of publication, query a network for web pages meeting the search criteria, and return query results. An engine could, for example, include modules, or an engine could be a module or component of a larger system.

For the purposes of this disclosure a web graph is a series of nodes and edges that represents the web, or a portion thereof. Nodes represent web pages, web hosts, and/or web domains while edges represent directional hyperlinks between web pages. The term features can be used to refer to either nodes or edges. Edges can be directional; in other words they represent directional hyperlinks. A user on a first node (web page) can access a second node (web page) via an edge (hyperlink), but cannot return to the first node via the same edge. A second edge with the opposite direction to the first edge can be used to directly access the first node from the second node. Although nodes can represent web pages, web hosts, and/or web domains, for clarity this disclosure assumes that nodes are web pages. Such reference is not to be taken as limiting.

Nodes can be associated with two types of data: properties and quality. Properties can include, but are not limited to, one or more of the following: name, content, inlinks, or outlinks. A name can be any string that represents or identifies the node. For instance, a name can be a universal resource locator. Alternatively, a name can be letters, "A" or "BB" for example. Alternatively, a name can comprise a string of numbers such as "000101," numbers and symbols such as "19@4*5," numbers and letters such as that seen in hexadecimal numbers like "C9BCE0F5," or any combination of one or more of the following: letters, numbers, symbols. Content can include, but is not limited to, categories for nodes such as "News," "Entertainment," or "Adult Media." Inlinks are the links that point to a given node, and outlinks are nodes that point out from a given node. For instance, assuming a starting node A, where A has a directional edge pointing towards node B, node A is outlinked to node B. The outlink is the edge pointing from node A to node B. Alternatively, if node B has an edge pointing towards reference node A, then B is inlinked to reference node A and the edge is the inlink. A node can have zero or more inlinks and outlinks.

Quality or quality score represents information or values associated with nodes and edges. One example of quality is a node's PAGERANK. Quality can also comprise, but is not limited to, one or more of the following node characteristics: time of creation, time of last modification, time of identification by a web crawler, number of visitors, click count, view count (a score for the number of times that a node is viewed whether or not that node is selected via clicking of a mouse), ad count (a score for the number of times that a node is associated with advertisements), ad revenue (a measure of advertising revenue that a node brings in based on its ad count), number of unique pages (for host or domain nodes), percentage of unique pages (for host or domain nodes), number of duplicate pages (for host or domain nodes), and/or percentage of duplicate pages (for host or domain nodes). Quality can also comprise scores for such things as amount and quality of spam, porn, news, entertainment, media, and other content categories. Quality can comprise any of the above-named elements, in any combination, and weighted in any fashion. For example, machine learning can be used to compute a weighted quality derived from any one or more of the above-name elements. Furthermore, quality may comprise scores specific to certain types of nodes. For instance, HostRank and DomainRank are scores assigned to web graphs of hosts and domains.

Edges can similarly be associated with two types of data: properties and quality. Properties can comprise the names of the nodes that an edge connects. For example, if an edge connects the nodes A and B, then the edge can comprise the name AB. Edge properties can also comprise, but are not limited to: weight, anchortext (the text of a hyperlink), and destination pages. In an embodiment, edges can comprise the same quality as the node from which they originate. Alternatively, edges can comprise a quality that is different from the node from which they originate.

For the purposes of this disclosure, both node and edge quality will derive from, but are not limited to, PAGERANK. This assumption is for convenience and clarity of example, and does not limit quality to PAGERANK.

Systems and methods are herein disclosed for both determining the similarity between web graphs and initiating web mapping based on the similarity between web graphs. One application of computing the similarity between a first and second web graph is to identify anomalies. An anomaly indicates that a web graph contains significant differences from the web graph that it is compared to. In some instances it can be desirable to remove the anomalous web graph from a database of web graphs, or to ignore the web graph during analysis. For instance, an anomaly can result when two web graphs do not share many common hosts. The more recently built web graph can be missing a significant number of hosts because something went wrong during the web crawl or the web graph building. As such, the web can be recrawled and a new web graph built in order to replace the anomalous web graph. The anomalous web graph can either be removed from the database of prior web graphs or can remain in the database but be ignored during operations that analyze the set of web graphs.

At the same time, it can be desirable to attempt to prevent subsequent anomalous web graphs. This can be accomplished by modifying the parameters governing web crawling and web building. For instance, one purpose of mapping the web is to monitor changes in the web. If the web is changing rapidly, then two consecutively-built web maps can miss details of the changing web. This can result in an anomaly. The frequency with which the web is crawled and web maps are built can be increased so that subsequent web graphs better track the changes in the web.

The frequency of web crawling and web graph building can be unnecessarily high in some situations. In such an instance, an anomaly can take the form of a web graph that is too similar to the previous web graph. Such an anomaly indicates that the web is changing slower than the frequency of web crawls and web graph builds. Such a situation can indicate that computing resources are being inefficiently used, and thus the frequency of web crawls and web graph builds can be decreased to better optimize resource usage.

FIG. 1 illustrates a method for determining the similarity between two web graphs and initiating web mapping based on the similarity. Selection can include extracting a first web graph from a database or accessing a first web graph from a database. Selection can include retrieving a web graph from a server or another system for storing data. In one embodiment, selection can include determining an address where the web graph resides and providing this address to the next operation in the method for subsequent web graph retrieval or access. A web graph can be selected in order to compare to a second web graph. The selection operation 102 can take place after the first and second web graph have been created. In one embodiment, the first web graph can be selected after the first web graph has been created.

Once a first web graph is selected it can be transformed into a sequence of tokens via a transform operation 104 sometimes referred to as tokenization. Tokenization demarcates and can classify sections of a string of input characters, thus allowing a computer to process a string. For instance, tokenization can split a sentence string into the words that make up the sentence. Take the sentence, "The quick brown fox jumps over the lazy dog" for example. A computer will treat this sentence as nothing more than 43 characters. However, in order that the computer can process this sentence, the string can be tokenized to form nine distinct word tokens. Although this example shows a string being broken into word tokens, tokenization can also create other token types such as paragraph, sentence, phrase, word, syllable, or phonemes tokens for example. Furthermore, there are a plurality of algorithms for tokenizing strings of text.

In an embodiment, tokenization transforms a first web graph into a first sequence of tokens where the sequence of tokens can be defined as $T=<t_1, \ldots, t_n>$. Such transformation can be carried out by tokenization, case folding, or other common information retrieval techniques. Such a sequence can be stored as a vector or as individual token units. For example, if the first web graph comprised three web pages with the names A, B, and C, then the sequence of tokens might be $T=<B, A, C>$. The order of the sequence can be determined by the intricacies of the transformation operation 104, which will be later described in detail with reference to FIG. 4.

Having created a first sequence of tokens T the method can identify a first set of token subsequence from the sequence T via an identify operation 106. A subsequence is a set of k consecutive tokens from the sequence T where k can be any integer from one to the number of tokens in sequence T. For example, assume that a sequence of tokens $T=<B, A, C>$ has been formed. Since there are three tokens, k can take the value 1, 2, or 3. Assuming k=2 the identified subsequences would be $<B, A>$ and $<A, C>$. The variable k can be determined via empirical analysis. In an embodiment, the value of k equals 3.

Once the first set of token subsequences have been identified, they can be fingerprinted to form a first set of shingles in a fingerprint operation 108. For the purposes of this disclosure, a shingle is a subsequence of tokens that has been fingerprinted. For the purposes of this disclosure, fingerprinting converts a block of text, or a string, into a number. The first set of shingles can be defined as S(T). For instance, given a sequence of tokens $T=<B, A, C>$, where the two subsequences (B, A) and (A, C) have been identified, fingerprinting can create the following set of two shingles: $S(T)=<(010, 001), (001, 011)>$. Shingles can be represented in binary, hexadecimal, or other formats.

Identical operations 112, 114, 116, 118 to those described above take a second web graph, transform it into a second sequence of tokens defined as $T'=<t_1', \ldots, t_n'>$, identify a second set of token subsequences, and form a second set of shingles S(T') via fingerprinting.

The first set of shingles can be compared to the second set of shingles. Once a first and second set of shingles are formed, the method 100 can compute the similarity between the first and second set of shingles via a computation operation 130. The similarity represents the similarity between the first and second web graph and can be computed via the following ratio:

$$\frac{S(T) \cap S(T')}{S(T) \cup S(T')}$$

where the numerator is the intersection of the first set of shingles S(T) and the second set of shingles S(T'), and where the denominator is the union of the first set of shingles S(T) and the second set of shingles S(T'). The union of two sets of numbers is the set of numbers contained in either set. For instance, the union of {1, 2, 3} and {2, 3, 4} is {1, 2, 3, 4}. Similarly, the number 9 is not contained in the union of prime numbers {2, 3, 5, 7, 11, . . . } and even numbers {2, 4, 6, 8, 10, . . . }, because 9 is neither prime nor even. In contrast, the intersection of two sets of numbers is the set of numbers contained in both sets. For instance, the intersection of {1, 2, 3} and {2, 3, 4} is {2, 3}. Similarly, the number 9 is not contained in the intersection of prime numbers {2, 3, 5, 7, 11, . . . } and odd numbers {1, 3, 5, 7, 9, . . . }, because 9 only appears in the set of odd numbers.

In an embodiment, the above ratio can be approximated via an unbiased estimate. The unbiased estimate chooses m random permutation functions $\pi_i$. Each random permutation function $\pi_i$ can be applied to the elements of S(T) and S(T'). For each application of $\pi_i$ the minimum resulting value is retained and referred to as a minvalue. The minvalues for a set of shingles forms an m-dimensional vector w for the first web graph and w' for the second web graph. The unbiased estimate of the similarity between the first and second web graphs equals the percentage of elements in w that are equivalent to elements in w'.

Once the similarity between a first and second web graph has been computed the method 100 initiates web mapping via an initiate web mapping operation 132. This web mapping 132 is based upon the results of the similarity computation 130. In an embodiment web mapping entails instructing a web crawler to crawl the web identifying web sites and collecting data about those web sites including outlinks from the web page to other web pages. Collected data can be used to build web graphs. In an embodiment, web graphs that are built can be selected as the first or second web graph in subsequent iterations of the method 100.

In an embodiment, web mapping can comprise modifying parameters that govern web crawling and web graph building. In an embodiment, the frequency with which a web crawler crawls the web is one parameter that can be modified. In another embodiment, the frequency with which a web graph is built from data collected by a web crawler is one parameter that can be modified. In yet another embodiment, a parameter that can be modified can be the speed with which a web crawler crawls the web. For instance, a web crawler's speed can be determined by the degree of analysis that the crawler performs on each web page that is crawled.

In another embodiment, modifying parameters can include instructing a web crawler to crawl the web, and/or building a web graph based on the results of this or another crawl. Such an instruction can instruct the web crawler to immediately crawl the web, instruct the web crawler to crawl the web at a specified later time, or can instruct the web crawler to delay a specified amount of time before crawling. For example, if the similarity computation indicates that an anomalous web graph was recently built, then the initiate web mapping operation 132 can instruct a web crawler to immediately begin crawling the web. From the data collected during this crawl a new web graph can be built and replace the anomalous web graph. In an embodiment, modifying the parameters that govern web mapping can include changing the frequency with which the web is crawled, changing the frequency with which web maps are built, or instructing a web crawler to crawl the web, and build a web graph based on the results of the crawl. Other combinations of operations and instructions are also envisioned.

Initiating web mapping 132 can comprise removing one or more web graphs from a set of web graphs. For example, web graphs can be built on a daily basis creating a set of web graphs. A web graph built on Tuesday can be found to be an anomaly as compared to the Monday web graph. As a result, the web mapping operation 132 can remove the Tuesday web graph from the set. Removing a web graph from a set of web graphs can include elimination of the web graph's data, disassociating the web graph with the set of web graphs without deleting the web graph's data, or modifying computer instructions such that the web graph is not considered in subsequent analyses. In addition to removing a web graph, the web mapping operation 132 can also modify parameters governing web mapping.

In an embodiment, a threshold value can be set such that when the computation operation 130 produces a value lower than the threshold, the web mapping operation 132 will initiate. When the similarity value is higher than the threshold the web mapping operation can not initiate. In an embodiment a value equal to the threshold can initiate web mapping 132. In another embodiment a value equal to the threshold can not initiate web mapping 132. In an embodiment, the threshold is a fixed value.

Although the operations acting on the first web graph 102, 104, 106 and 108 can be performed in parallel with the operations acting on the second web graph 112, 114, 116 and 118, they can also operate serially. In an embodiment, those operations 102, 104, 106 and 108 dealing with the first web graph can be performed initially followed by the operations 112, 114, 116 and 118 performed on the second web graph. In an embodiment, the sequence of operations for a first web graph or a second web graph can be performed on a plurality of web graphs simultaneously. In such an embodiment, one or more pairs of web graphs could have their similarities simultaneously computed via the computation operation 130. Furthermore, in such an embodiment, the computation operation 130 can simultaneously compute the similarity between a first web graph and multiple other web graphs. For instance, the similarity between a first and second web graph could be computed via the operation 130 while at the same time the operation 130 could compute the similarity between a first and third web graph.

In an embodiment, the initiate web mapping operation 132 can be based on multiple similarity computation operations 130. For instance, the computation operation 130 can compare the similarity between web graphs that have been created over the course of a week. As such, the initiate web mapping operation 132 would be based on a week's worth of similarity computations rather than just a single similarity computation. Alternatively, the computation operation can indicate anomaly trends. For instance, web graphs can be built from web crawls that take place three times per day: in the morning, midday, and evening. If the similarity between web graphs over a period of weeks showed consistent anomalies during evenings, it could be indicative that the web changes too quickly in the evenings in order for a single web crawl to accurately capture those changes. As such, the initiate web mapping operation 132 can increase the frequency with which the web is crawled and web graphs are built during evenings.

Figure 2:
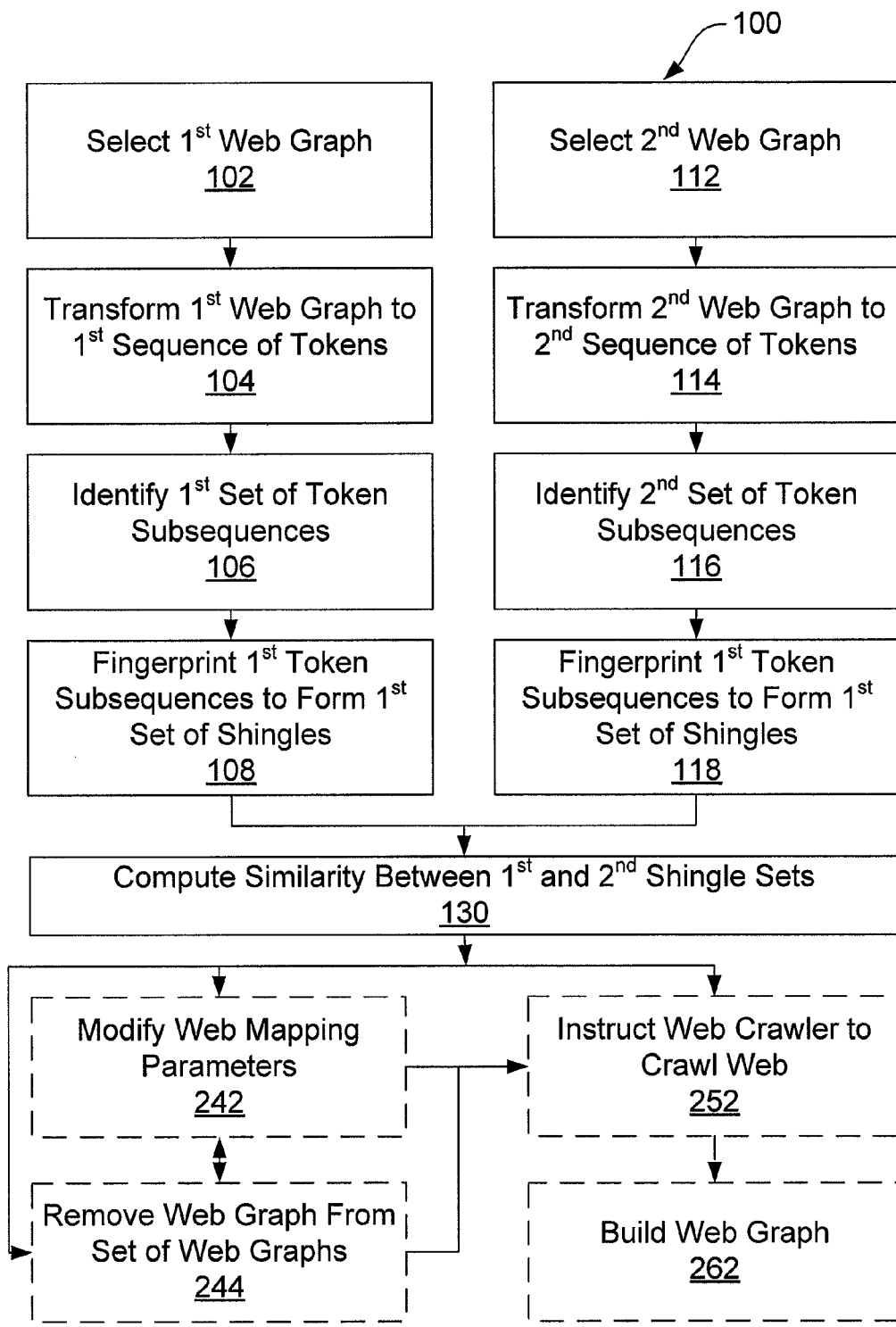
FIG. 2 illustrates a method for determining the similarity between two web graphs and initiating web mapping based on the similarity.

FIG. 2 illustrates a method for determining the similarity between two web graphs and initiating web mapping based on the similarity. Since the computation operation 130 can sometimes indicate that an anomalous web graph exists, the final operation in the method 100 can vary for each loop of the method 100. Operations 102, 104, 106, 108, 112, 114, 116, 118, and 130 can not vary from loop to loop. However, the final operation 132 can vary. The illustrated embodiment illustrates an embodiment in which some combination of modifying web mapping parameters 242, removing a web graph 244, instructing a web crawler to crawl the web 252, and building a web graph are carried out subsequent to the similarity computation operation 130. In an embodiment, the computation 130 is followed by modification of web mapping parameters 242. In another embodiment, the computation 130 is followed by a modification of web mapping parameters operation 242, an instruct web crawler to crawl the web operation 252, and a build web graph operation 262. In yet another embodiment, the computation operation 130 is followed by an instruct web crawler to crawl the web operation 252, and a build web graph operation 262. In another embodiment, the computation operation 130 is followed by an instruct web crawler to crawl the web operation 252, a build web graph operation 262, and a modify web mapping parameters. This embodiment might be utilized where an anomaly requires an immediate recrawl and new web graph building operation, but where parameters governing future crawls and builds need also be modified. Thus, the crawl and build operations 252, 262 would initiate before the web mapping parameters were modified via the operation 242. In an embodiment the removal operation 244 can take place before or after the modify operation 242. At the same time it should be understood that any number of the four operations 242, 244, 252, 262 can be carried and they can be carried out in any order. Although these embodiments are described as serial sequences, the operations 242, 252, and 262 can also be carried out in parallel or a combination of parallel and serial operations.

Figure 3:
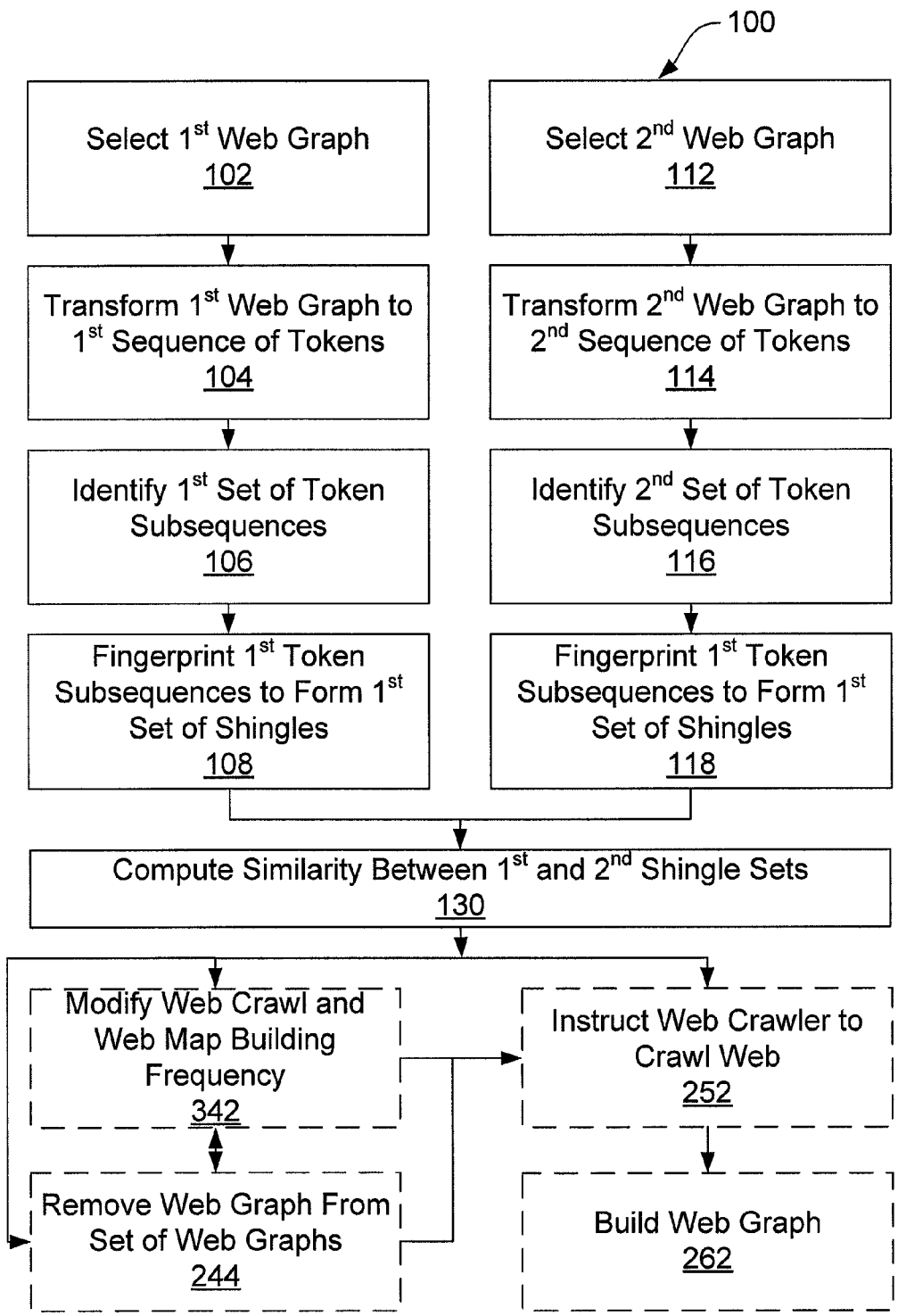
FIG. 3 illustrates a method for determining the similarity between two web graphs and initiating web mapping based on the similarity.

FIG. 3 illustrates a method for determining the similarity between two web graphs and initiating web mapping based on the similarity. In one embodiment, the frequency with which the web is crawled and with which web graphs are built can be the web mapping parameter that is changed via the operation 342. The frequency with which the web is crawled and with which web graphs are built can increase or decrease. Such modifications of the frequency can be proportional to the similarity computed in the computation operation 130. Alternatively, the frequency can be modified by using an algorithm that converts the similarity into a unit of increment/decrement that is applied to the frequency.

Figure 4A:
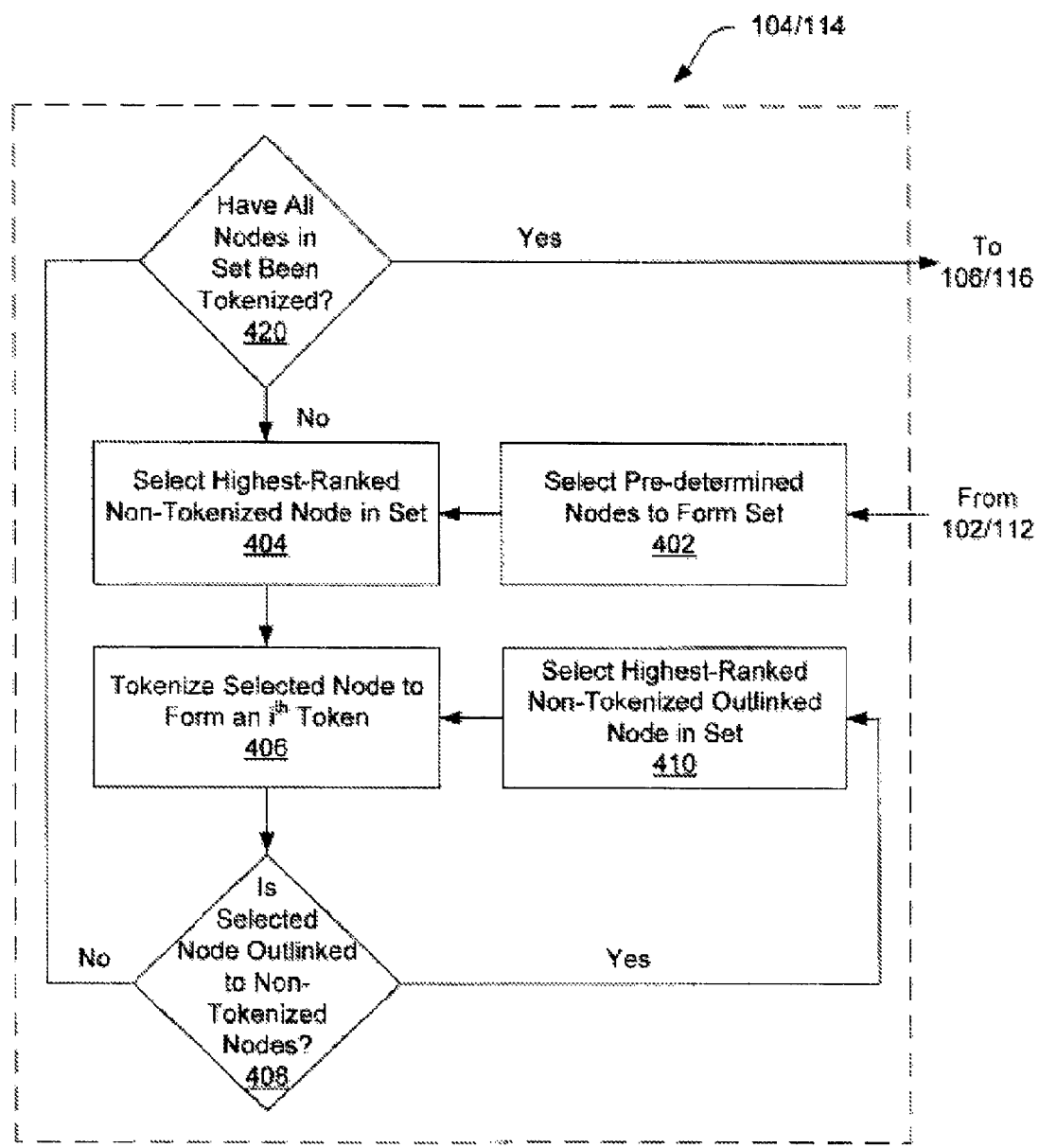
FIGS. 4A and 4B illustrate a method for transforming a web graph into a sequence of tokens.

FIG. 4A illustrates a method for transforming a web graph into a sequence of tokens. Once the web graph has been selected via the selection operation 102/112 the transformation operation 104/114 can begin by selecting pre-determined nodes in the first web graph to form a set of nodes in the selection step 402. The pre-determined nodes can include all nodes in the first web graph. Alternatively, the pre-determined nodes can be a subset of all nodes in the first web graph. For instance, the pre-determined nodes can include only hosts. Selecting nodes can comprise identifying data associated with the pre-determined nodes and storing that data for use in subsequent operations. Selecting nodes can comprise identifying data associated with the pre-determined nodes and passing that data to subsequent operations. Selecting nodes can comprise identifying an address associated with each pre-determined node and passing this address to subsequent operations so that those operations can access the node data. The set of nodes can comprise data associated with each node in the set. In an embodiment the set of nodes can comprise an address associated with each node in the set.

Figure 4B:
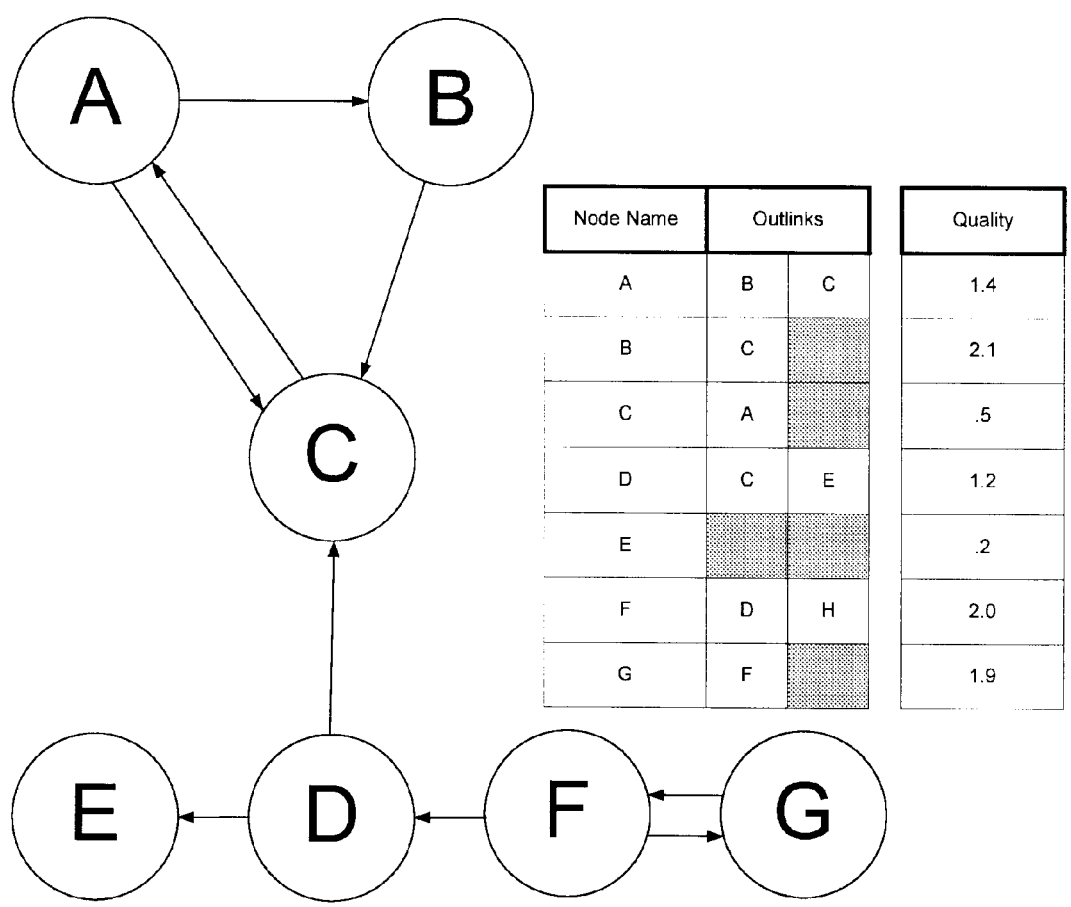

Once the set of nodes is formed a selection operation 404 can select the highest-ranked non-tokenized node in the set. On the first iteration there will not be any tokenized nodes and thus the selection operation 404 merely selects the highest-ranked node in the set. For instance, is a web graph comprising three nodes named "A," "B," and "C", as illustrated in FIG. 4B. Node B has the highest quality score at 2.1 and hence the highest rank. The quality score for each node is pre-determined and stored either while the web is crawled or after the web has been crawled. The crawler can either store the quality score and/or identify an address for the quality score such that other operations can access the quality score. Once a web graph is created, the selection step 404 accesses the quality scores for all non-tokenized nodes and determines which quality score is largest. The selection step 404 can select this node as the selected node.

Once a selected node exists it can be tokenized via the tokenize step 406 to form an $i^{th}$ token where i is equal to the number of tokenized nodes plus one. In the first iteration since no nodes have been tokenized i=1 and thus the tokenize step 406 will form a first token. In the example above the first token is $t_1$ so the sequence of tokens would be T=<$t_1$>. In the example the sequence would be T=<B> after the first tokenize step 406 executes.

Having formed the first token, a determination 408 determines if the selected node is outlined to non-tokenized nodes. For instance, if the selected node does not have any outlinks, then the operation 104/114 will proceed to the determination 420. As another example, if the selected node outlinks only to nodes that have been tokenized, then the operation 104/114 will proceed to the determination 420. If the selected node outlinks to at least one non-tokenized node, then the selection step 410 selects the highest-ranked non-tokenized outlinked node in the set of nodes. In the example node C is the only outlinked node from node B and it has not been tokenized. Thus, the selection step 410 would select node C as the selected node. If there were multiple outlinked nodes, then of the outlinked nodes that were not previously tokenized, the selection step 410 could select the highest-ranked node as the selected node.

The selected node can be tokenized in the tokenize step 406 just as for the first token. The tokenize step 406 forms the second token since i=2 (one node has been tokenized). In the example, tokenizing node C would modify the token sequence such that T=<B, C>.

The determination 408, the selection step 410, and the tokenize step 406 repeat until the determination 408 determines that the selected node is not outlinked to any non-tokenized nodes. In the example since node B is outlinked to node A, the determination 408 would produce a positive determination and the selection step 410 would select the highest-ranked non-tokenized outlinked node which would be node A. The token sequence would then T=<B, C, A>. The operation 104/114 then proceeds to the determination 420 where it is determined whether all nodes in the set have been tokenized. In other words, are there any nodes in the set that have not been tokenized. If all nodes have been tokenized, then the operation 104/114 is complete and operation 106/116 would initiate. If all nodes have not been tokenized, then the loop begins again with the selection step 404. Restarting with step 404 allows the operation 104/114 to select a next node when there are no outlinks to any non-tokenized nodes. Continuing with the example, there are four non-tokenized nodes so the determination 420 produces an affirmative response resulting in the selection step 404 selecting the highest-ranked non-tokenized node in the set. The non-tokenized nodes comprise E, D, F, and G. The highest-ranked node is F with a quality of 2.0, so node F would be selected as the selected node.

The steps 406 and 410 and the determination 408 continue as described until all nodes have been tokenized. The series of steps and determinations described above are referred to as a walk algorithm. In the example the walk algorithm would continue to fill out the token sequence resulting in T=<B, C, A, F, D, E, G>. An identical walk algorithm can be applied to the second web graph with the only variations being that the selection step 402 will select pre-determined nodes from the second rather than the first web graph, and the tokenize step 406 will form a $j^{th}$ rather than an $i^{th}$ token.

Although the walk algorithm is illustrated and described in a particular order, the steps and determinations can also be carried out in different orders. The steps and determinations can also be broken up. For instance the selection step 410 could be broken into four steps operating in any order. One example is for the non-tokenized nodes to be selected from the outlinked nodes. From these non-tokenized outlinked nodes the highest-ranked node could be selected.

In one embodiment, the walk algorithm can perform the determination 420 after a constant number of tokenization steps 406. In an embodiment where this constant number is equal to three for instance, the steps 406 and 410 and the determination 408 would loop until either it is determined that the selected node does not outlink to any non-tokenized nodes, or until three nodes have been tokenized. When either criteria is met, the determination 420 is then performed.

Figure 5:
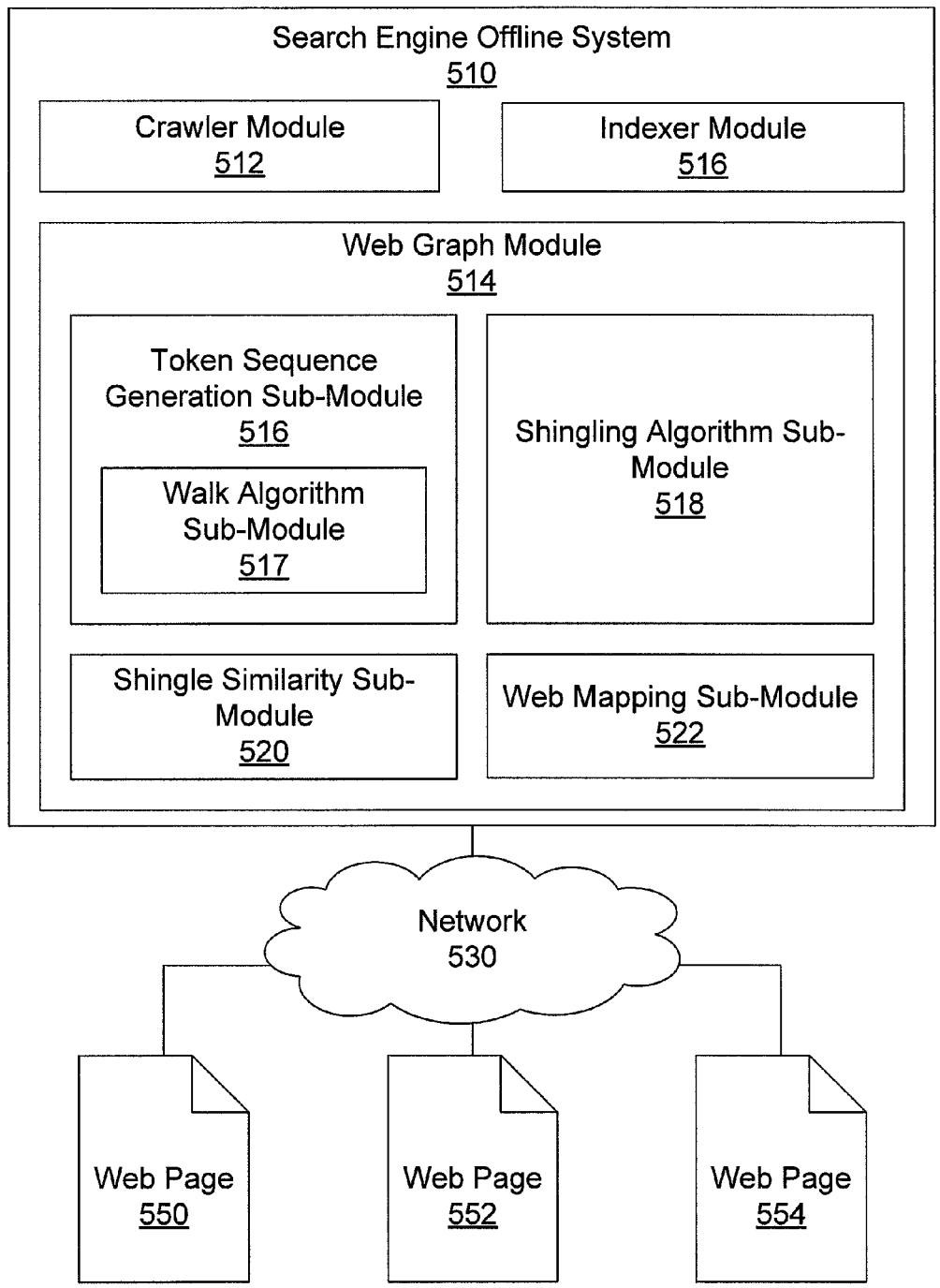
FIG. 5 illustrates a system capable of carrying out the disclosed methods.

FIG. 5 illustrates a system capable of carrying out the disclosed methods. A search engine generally has an online and offline system. The online group processes user queries in real time and returns search results. The offline system 510 collects content from web pages 550, 552, 554 and prepares it for the online group. In the illustrated embodiment, the offline group 510 comprises three modules: the crawler module 512, the indexer module 516, and the web graph module 514. The crawler module can comprise or instruct a web crawler to crawl the web and gather web pages and data via a network 530. The web graph module 514 creates web graphs from the web pages and from the data that the crawler collects. The web graph module 514 monitors similarity between web graphs by selecting a first and second web graph and computing the similarity between the first and second web graph. In response to finding one or more anomalous web graphs the web graph module 514 carries out operations to remove anomalies and modify parameters governing web mapping. The indexer module 516 indexes web pages using their content as retrieved by the web crawler. The indexer module 516 can also use the similarity as determined by the web graph module 516 to index web pages.

The web graph module 514 can comprise a token sequence generation sub-module 516. The sub-module 516 can transform the first web graph into a first sequence of tokens where the sequence of tokens is defined as T=<$t_1$, . . . , $t_n$>. Such transformation can be carried out by tokenization, case folding, or other common information retrieval techniques. The sub-module 516 also can identify a first set of token subsequences from T wherein each subsequence comprises k tokens. The value of k can be empirically derived. In an embodiment, k=3. The sub-module 516 can also transform the second web graph to a second sequence of tokens where the sequence of tokens is defined as T'=<$t_1'$, . . . , $t_n'$>. The sub-module 516 can also identify a second set of token subsequences from T' wherein each subsequence comprises k tokens.

Transforming a web graph into a sequence of tokens can be performed by a walk algorithm sub-module that carries out the walk algorithm discussed with reference to FIGS. 4A and 4B. The token sequence generation sub-module 516 can comprise the walk algorithm sub-module 517. In an embodiment, the walk algorithm sub-module 517 can be separate from the token sequence generation sub-module 516.

The web graph module 514 can further comprise a shingling algorithm sub-module 518. This sub-module 518 fingerprints the first and second sets of token subsequences, T and T' respectively, to form a first and second set of shingles. The first set of shingles can be defined as S(T) while the second set of shingles can be defined as S(T').

The web graph module 514 can further comprise a shingle similarity sub-module 520. This sub-module 520 can compute the similarity between the first and second web graphs by calculating the following ratio:

$$\frac{S(T) \cap S(T')}{S(T) \cup S(T')}$$

where the numerator is the intersection of the first set of shingles S(T) and the second set of shingles S(T'), and where the denominator is the union of the first set of shingles S(T) and the second set of shingles S(T'). The union of two sets of numbers is the set of numbers contained in either set. For instance, the union of {1, 2, 3} and {2, 3, 4} is {1, 2, 3, 4}. Similarly, the number 9 is not contained in the union of prime numbers {2, 3, 5, 7, 11, . . . } and even numbers {2, 4, 6, 8, 10, . . . }, because 9 is neither prime nor even. In contrast, the intersection of two sets of numbers is the set of numbers contained in both sets. For instance, the intersection of {1, 2, 3} and {2, 3, 4} is {2, 3}. Similarly, the number 9 is not contained in the intersection of prime numbers {2, 3, 5, 7, 11, . . . } and odd numbers {1, 3, 5, 7, 9, . . . }, because 9 only appears in the set of odd numbers.

In another embodiment, the shingling algorithm sub-module 520 can compute the similarity between the first and second web graphs by approximating the above ratio via an unbiased estimate. The unbiased estimate chooses m random permutation functions $\pi_i$. Each random permutation function $\pi_i$ can be applied to the elements of S(T) and S(T'). For each application of $\pi_i$ the minimum resulting value is retained and referred to as a minvalue. The minvalues for a set of shingles forms an m-dimensional vector w for the first web graph and w' for the second web graph. The unbiased estimate of the similarity between the first and second web graphs equals the percentage of elements in w that are equivalent to elements in w'.

In an embodiment, the web mapping sub-module 522 can modify parameters that govern web mapping. In an embodiment, this can comprise modifying the frequency with which the web is crawled, and modifying the frequency with which web maps are built from one or more crawls by the crawler. In another embodiment, modifying parameters can comprise removing a web graph from a set of web graphs. In an embodiment, modifying parameters can comprise instructing the web crawler module to crawl the web, and instructing the web mapping sub-module to build a web graph based on the results of the crawl.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. For example, in an embodiment, the web graph module 514 and the search engine offline system 510 can be separate systems operating on the same or different computing devices.

Numerous other changes can be made that will readily suggest themselves to those skilled in the art and which are encompassed in the spirit of the invention disclosed and as defined in the appended claims.

What is claimed is:

1. A method comprising:
    selecting a first web graph;
    transforming the first web graph to a first sequence of tokens defined as $T = \langle t_1, \ldots, t_n \rangle$ wherein $t_1, \ldots, t_n$ are tokens in the first sequence T;
    identifying a first set of token subsequences wherein each subsequence comprises k tokens;
    fingerprinting the first set of token subsequences to form a first set of shingles defined as S(T);
    selecting a second web graph;
    transforming the second web graph to a second sequence of tokens defined as $T' = \langle t_1', \ldots, t_n' \rangle$ wherein $t_1', \ldots, t_n'$ are tokens in the second sequence T';
    identifying a second set of token subsequences wherein each subsequence comprises k tokens;
    fingerprinting the second set of token subsequences to form a second set of shingles defined as S(T');
    computing the similarity between the first and second sets of shingles; and
    initiating web mapping based on the similarity between the first and second set of shingles, web mapping comprises:
        instructing a web crawler to crawl the web; and
        building a third web graph based on the results of the web crawler's crawl.

2. The method of claim 1 wherein web mapping comprises: modifying parameters that govern web mapping.

3. The method of claim 2 wherein modifying parameters comprises:
    changing the frequency with which the web is crawled; and
    changing the frequency with which web maps are built from one or more crawls.

4. The method of claim 1 wherein web mapping comprises removing the second web graph from a set of web graphs.

5. The method of claim 1 wherein transforming a first web graph to a first sequence of tokens comprises:
    selecting pre-determined nodes in the first web graph to form a first set of nodes;
    determining if all nodes in the first set have been tokenized;
    selecting a highest-ranked non-tokenized node from the first set as a selected node;
    tokenizing the selected node to form an $i^{th}$ token where i is equal to the number of nodes previously tokenized plus one;
    determining if the selected node is outlinked to non-tokenized nodes in the first set;
    selecting a highest-ranked non-tokenized outlinked node from the first set as the selected node;
    repeating the tokenizing the selected node to form an $i^{th}$ token operation, the determining if the selected node is outlinked to non-tokenized nodes in the first set operation, and the selecting a highest-ranked non-tokenized outlinked node from the first set as the selected node operation until it is determined that the selected node is not outlinked to any non-tokenized nodes in the first set; and
    determining if all nodes in the first set have been tokenized.

6. The method of claim 1 wherein transforming a second web graph to a second sequence of tokens comprises:
    selecting pre-determined nodes in the second web graph to form a second set of nodes;
    determining if all nodes in the second set have been tokenized;
    selecting a highest-ranked non-tokenized node from the second set as a selected node;
    tokenizing the selected node to form a first token;
    determining if the selected node is outlinked to non-tokenized nodes in the second set;
    selecting a highest-ranked non-tokenized outlinked node from the second set as the selected node;
    repeating the tokenizing the selected node to form a $j^{th}$ token operation, the determining if the selected node is outlinked to non-tokenized nodes in the second set operation, and the selecting a highest-ranked non-tokenized outlinked node from the second set as the selected node operation until it is determined that the selected node is not outlinked to any non-tokenized nodes in the second set; and
    determining if all nodes in the second set have been tokenized.

7. The method of claim 1 wherein computing the similarity between the first and second set of shingles comprises computing the similarity between the first and second web graphs as the following:

$$\frac{S(T) \cap S(T')}{S(T) \cup S(T')}$$

where the numerator is the intersection of the first set of shingles S(T) and the second set of shingles S(T'), and where the denominator is the union of the first set of shingles S(T) and the second set of shingles S(T').

8. The method of claim 1 wherein computing the similarity between the first and second set of shingles comprises computing an unbiased estimate of the following:

$$\frac{S(T) \cap S(T')}{S(T) \cup S(T')}$$

where the numerator is the intersection of the first set of shingles S(T) and the second set of shingles S(T'), and where the denominator is the union of the first set of shingles S(T) and the second set of shingles S(T').

9. The method of claim 1 wherein k=3.

* * * * *